United States Patent
Boltshauser

(10) Patent No.: US 9,365,344 B2
(45) Date of Patent: Jun. 14, 2016

(54) METHOD FOR THE PRODUCTION OF A CAN BODY, AND CAN BODY

(75) Inventor: Werner Boltshauser, Bütschwil (CH)

(73) Assignee: CAPROSOL AG, Butschwil (CH)

( * ) Notice: Subject to any disclaimer, the term of this patent is extended or adjusted under 35 U.S.C. 154(b) by 3010 days.

(21) Appl. No.: 11/629,472

(22) PCT Filed: Jun. 17, 2005

(86) PCT No.: PCT/CH2005/000341
§ 371 (c)(1),
(2), (4) Date: Oct. 1, 2007

(87) PCT Pub. No.: WO2005/123323
PCT Pub. Date: Dec. 29, 2005

(65) Prior Publication Data
US 2008/0164241 A1    Jul. 10, 2008

(30) Foreign Application Priority Data

Jun. 17, 2004  (WO) ............... PCT/CH2004/000368
Jan. 14, 2005  (WO) ............... PCT/CH2005/000016

(51) Int. Cl.
*B23K 26/00*  (2014.01)
*B65D 83/38*  (2006.01)
(Continued)

(52) U.S. Cl.
CPC ............... *B65D 83/38* (2013.01); *B21D 51/26* (2013.01); *B23K 26/282* (2015.10); *B23K 2201/125* (2013.01); *B23K 2203/04* (2013.01);
(Continued)

(58) Field of Classification Search
CPC ............. B21D 51/26; B23K 2201/125; B23K 2203/04; B23K 2203/10; B23K 26/282; B65D 83/38; B65D 83/42; Y10T 428/12493
USPC ................... 29/413, 235; 219/121.64, 121.67
See application file for complete search history.

(56) References Cited

U.S. PATENT DOCUMENTS 3,337,944 A * 8/1967 Morris ........................... 29/413
4,095,544 A   6/1978 Peters et al.
(Continued)

FOREIGN PATENT DOCUMENTS

EP         0 200 098      11/1986
EP         0 208 564      1/1987
(Continued)

*Primary Examiner* — Dana Ross
*Assistant Examiner* — Joseph Iskra
(74) *Attorney, Agent, or Firm* — Harness, Dickey & Pierce, P.L.C.

(57) ABSTRACT

To fix a valve piece encompassing a connecting shell and a valve to a can jacket, an embodiment of a method includes a welding step in which the connecting shell of the valve piece is fastened to the can jacket as a top closing element along with the valve by laser welding. According to an embodiment, a shoulder-shaped constricted cross section is embodied on the can jacket towards the top face thereof while the border area of the closing element which rests against the shoulder is tightly pressed theragainst and is sealingly joined to a laser seam, the top face of the can jacket lying inside the can. The method dispenses with the need to configure or fix a valve seat while eliminating the technically complex crimping step, thus also dispensing with the need for an installation used for crimping connecting shells in the filling station. The method makes it possible to produce also aerosol cans whose diameter is smaller than the diameter of a standard valve seat.

14 Claims, 3 Drawing Sheets

(51) Int. Cl.
  *B21D 51/26* (2006.01)
  *B65D 83/42* (2006.01)

(52) U.S. Cl.
  CPC ............. *B23K2203/10* (2013.01); *B65D 83/42* (2013.01); *Y10T 428/12493* (2015.01)

(56) References Cited

U.S. PATENT DOCUMENTS

| | | | |
|---|---|---|---|
| 4,199,851 A * | 4/1980 | Doherty | 29/235 |
| 4,315,132 A * | 2/1982 | Saurin et al. | 219/121.64 |
| 4,341,943 A * | 7/1982 | Nilsen | 219/121.64 |
| 4,467,171 A * | 8/1984 | Ramos | 219/121.67 |
| 4,591,405 A * | 5/1986 | Languillat | 156/446 |
| 4,615,470 A | 10/1986 | Hyland et al. | |
| 4,694,137 A * | 9/1987 | Hawkins et al. | 219/121.63 |
| 4,889,023 A * | 12/1989 | Languillat | 82/92 |
| 4,905,858 A * | 3/1990 | Budenbender | 220/612 |
| 5,086,677 A * | 2/1992 | Languillat | 82/92 |
| 5,111,721 A * | 5/1992 | Languillat | 82/47 |
| 5,170,684 A * | 12/1992 | Lofstrom | 82/70.1 |
| 5,186,592 A * | 2/1993 | Budenbender | 413/2 |
| 5,313,862 A * | 5/1994 | Johansson | 83/156 |
| 5,511,826 A * | 4/1996 | Clare et al. | 285/5 |
| 5,997,232 A * | 12/1999 | Sauer | 413/1 |
| 6,581,401 B1 * | 6/2003 | Anthony | 62/293 |
| 7,670,094 B2 * | 3/2010 | Boltshauser | 413/2 |
| 2004/0188394 A1 * | 9/2004 | Becker et al. | 219/121.64 |
| 2005/0166979 A1 * | 8/2005 | Berger et al. | 137/630.15 |
| 2005/0167091 A1 * | 8/2005 | Juschka | 165/173 |
| 2007/0177962 A1 * | 8/2007 | Boltshauser | 413/2 |
| 2008/0164241 A1 * | 7/2008 | Boltshauser | 219/121.64 |

FOREIGN PATENT DOCUMENTS

| | | |
|---|---|---|
| EP | 0 666 124 | 8/1995 |
| EP | 0 853 513 | 7/1998 |
| EP | 0 853 514 | 7/1998 |
| EP | 0 853 515 | 7/1998 |
| FR | 2 543 923 | 10/1984 |
| WO | WO 00/35772 A | 6/2000 |
| WO | WO 0035772 A1 * | 6/2000 |
| WO | WO 2005/000498 A | 1/2005 |
| WO | WO 2005/068127 A | 7/2005 |

* cited by examiner

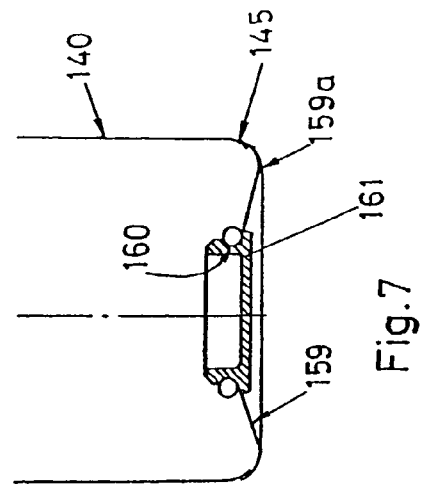
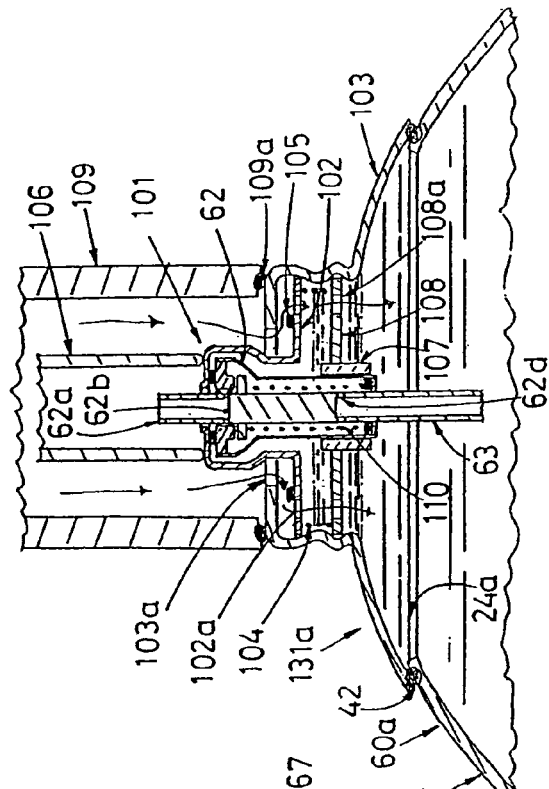
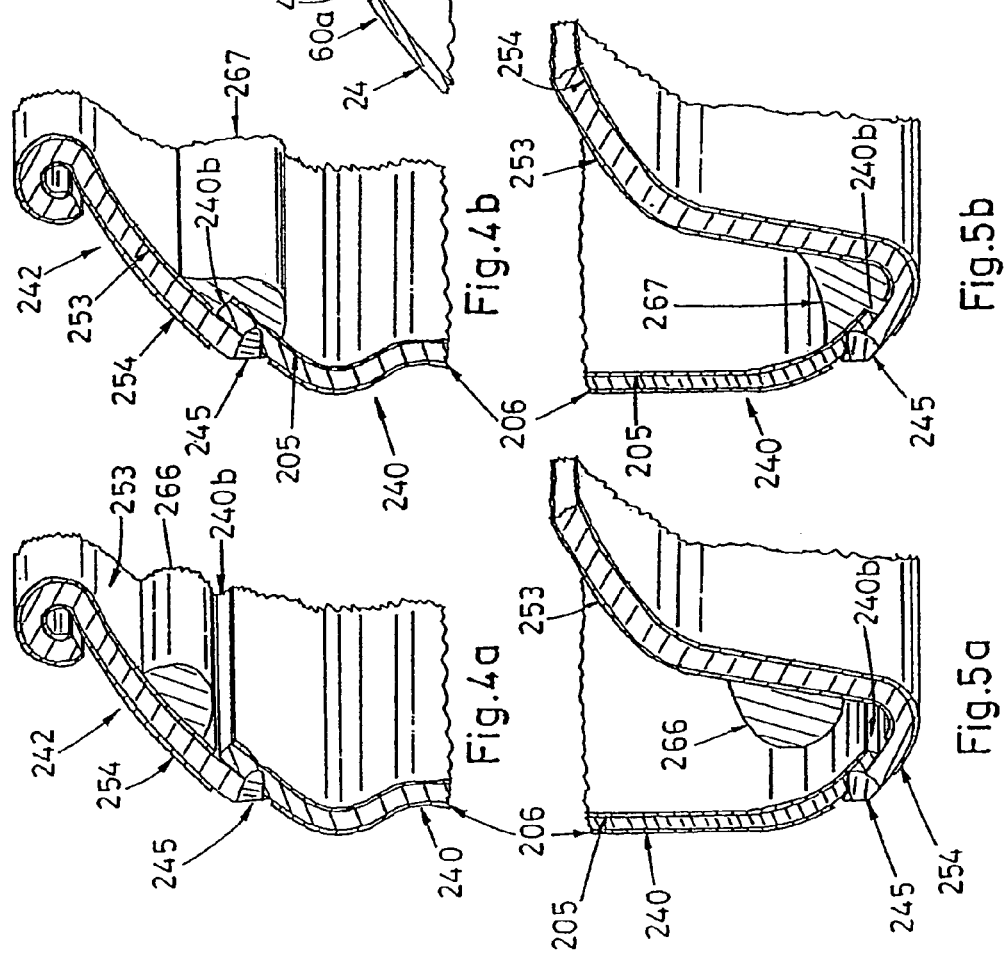

METHOD FOR THE PRODUCTION OF A CAN BODY, AND CAN BODY

FIELD

The invention generally relates to a method for affixing a valve to a can shell, and/or to a can body.

BACKGROUND

Aerosol cans have either a one-part or multi-part design. In the case of one-part aerosol cans made of aluminum, the cylindrical can body is produced by cold sinking. Subsequently, a valve seat is formed at the open end by means of compressive necking down. This type of production process is very expensive and involved as a result of the equipment requirements for the many processing steps, as well as the water and energy requirements for cleaning and drying. Patent documents U.S. Pat. No. 4,095,544 and EP 0 666 124 A1 describe the production of seamless steel cans, wherein a cylindrical can body is manufactured from a steel sheet coated with tin or plastic material by punching, pressing and ironing. It has turned out that enormous problems occur with forming restricted neck portions, because the material structure is changed and/or hardened by the ironing. Also widely used are cans made from sheet steel for which the shell has a longitudinal welding seam. The bottom and the upper closure are attached to the can shell by folded seam connections. With folded seam connections sealing problems can occur which, for example, are reduced with the aid of sealing rings. With the standard cans having extremely thin walls problems occur with seals that are arranged at the end faces. Two-part or multi-part cans are known from documents EP 200 098 A2 and EP 208 564, for which the parts are joined by means of laser welding. The can shape that is predetermined by the known laser-welded seams in the connecting regions between can wall and bottom and/or valve seat is very unattractive. In addition, no cost-effective production with sufficiently high piece numbers is possible with the known methods. The above-mentioned longitudinal welding seams, particularly those described in document U.S. Pat. No. 4,341,943, have small offsets and/or thickness differences in peripheral direction, which can lead to problems during the welding-on of the closure members.

A valve seat is provided on the can body for securing valves on aerosol cans. A connecting bowl is crimped onto the valve seat together with the valve. Hairline cracks will form on the valve seat if the valve seat is formed by necking down and reshaping the can shell, which can lead to undesirable microscopic leaks following the crimping on of the connecting bowl. Hairline cracks can also occur on a valve seat that is formed onto a closure member, separately from the can shell. Even if no hairline cracks appear, the crimping on of the connecting bowl to the valve seat represents an involved processing step. In addition, a valve seat with standard diameter is used for aerosol cans with differently large diameters, meaning a minimum can diameter must be maintained for small cans.

Aerosol cans are described in International Application WO 00/35772, for which the closure member is welded together with the valve onto the can shell by forming a laser welding seam. Document FR 2 543 923 describes a can, for which a can closure member is attached together with the valve seat by means of laser welding to the can shell. The above-described solutions for the welding seams comprise flanges and/or seam contact regions that are cylindrical or project radially outward, relative to the can axis, thereby resulting in an unattractive appearance for the cans. The end faces of the two flanges to be joined project outward from the can body during the welding. The reshaping of the flanges following the welding operation is extremely involved because the welding seam generates high form stability at the flanges. Even reshaped flanges are undesirable for many aerosol cans, for example in the cosmetics field, in particular for cans with small diameters.

SUMMARY

It is the object of at least one embodiment of the present invention to find a solution, which permits a cost-effective production of aesthetically attractive cans.

When solving this object, it was discovered during a first inventive step that the configuration with valve seat and valve with connecting bowl stems from the fact that the valves are fitted onto the aerosol cans at the filling plant, so as to permit a filling prior to fitting on the valves. However, it has turned out that a great many products are filled through the valve into the can, meaning that a filling in of the products through a ring-shaped area between valve seat and connecting bowl and a subsequent crimping on is therefore not needed for many products. The valve can thus be affixed prior to the filling operation.

With aerosol cans that are filled through the valve, the upper end region of the can shell can be connected to an upper closure member with valve. The closure member essentially takes the form of a connecting bowl without wrap-around area for the valve seat. The valve is arranged in the center of the closure member and the closure member preferably has a dome-shaped design. The closure member with the valve is then attached to the can shell with a laser-welded seam. An annular, closed seam thus ensures a tight and secure connection, requiring little expenditure, if the exposed end of the can shell is somewhat narrowed down, so that the adjoining edge region of the closure member is pressed on tight and is attached with a laser welding seam to the can shell. By arranging sealing material on the inside of the can shell, in the region of the welding seam, a complete inside coating is ensured following the welding of the can body.

At least one embodiment of the inventive solution has many advantages. It is possible to dispense with forming or fitting a valve seat onto the can body and the expensive crimping step is also omitted. Correspondingly, there is no need at the filling plant to have equipment for crimping on the connecting bowls. In addition, aerosol cans with a diameter that is smaller than the diameter of the standard valve seat can be produced.

A laser-welded connection between can shell and closure member can be formed particularly easily if the can shell has a constant thickness at the upper end. That is the case with can bodies, produced with the deep-drawing method or where the can shell was closed by having a longitudinal butt welding seam.

With the aid of a material that can melt and thereby flow over the seam, preferably a thermoplastic polyester, the can inside wall can be sealed along the ring-shaped seam between can shell and a closure member. In the process, an annular bead of a melting sealing material is affixed to the closure member, along the outer edge region. Once the circular welding seam has been formed, this annular bead is heated to the partial melting stage, such that it can flow and form a bridge between the inside coating of the closure member and the inside film of the shell. This bridge completely covers the end face of the edge region on the can inside and, if necessary, also the welding seam on the can inside, so as to prevent corrosion in the area of transition between can shell and closure member.

Some products cannot be filled quickly enough into the aerosol can by means of the discharge and/or spray opening of the valve. According to the prior art, these products can only be filled into cans with a valve seat, wherein the valve is crimped to the valve seat only after the product is filled in. The propellant gas is subsequently filled in through the inserted valve. According to one preferred embodiment, however, a quick filling in of the product should still be possible if a closure member with secure installed valve has already been attached by means of a laser seam to the can shell.

Within the framework of an inventive step, it was recognized that a valve part with two different flow-through cross sections permits a quick filling in of the product, the introduction of the propellant gas, as well as the discharge of the product during its use, wherein a targeted adjustment of the two flow-through cross sections should be possible. That is to say, the cross section required for spraying the product is adjusted in a first opening state. In a second opening state, a larger cross section is then formed by correspondingly applying a pressing force, wherein either the pressing force is differently high and/or the pressing force is applied to different regions of the valve.

If necessary, the pressing force for achieving the larger opening cross section can be provided via the fluid to be filled in. Since the large cross section is needed only for the filling operation, an arrangement in the form of a one-way valve can be used for opening up the large cross section. For that, an elastic sealing element can be positioned so as to be in a sealing position, without pressure load and also because of the can inside pressure. The elastic sealing element can be pushed into an open position by a sufficiently high pressure that is applied from the outside to the valve. An aerosol can valve with elastic sealing element, which is embodied to achieve a large opening cross section, is also disclosed in document U.S. Pat. No. 4,615,470, wherein this known valve permits a quick filling in of propellant gas.

According to a first embodiment, the valve has two opening states with different operating cross sections, wherein during the transition from the first opening state to the second state, a predetermined opening pressing force must be exceeded. To prevent a shifting to the second opening state once the can is filled, a fixing step is advantageously realized following the filling operation, so as to restrict the valve to the first opening state. This can be achieved, for example, with a deformation on the connecting bowl for the valve, wherein the deformation takes the shape of an end stop preventing an undesirable movement to the second opening state.

According to a second embodiment, the valve is designed as two-way valve, comprising two separate passageways with differently large cross sections. The first passageway is formed by a standard can valve. The second passageway is formed between an inner connecting part of the standard valve and an outer connecting part that is securely welded to the can shell. The inner connecting part, which normally is formed as connecting bowl, in this case is formed such that it is pressed from the can inside against a sealing region of the outer connecting part. A ring-shaped flow-through opening to the can inside is thus created between the inner connecting part and the outer connecting part if the inner connecting part is pressed against the can inside.

The spring force against which the connecting region must be pressed on should clearly exceed the forces required for activating the standard valve. The product should be released in the known manner from the aerosol can by means of a central discharge tube, without danger of the ring-shaped valve opening up as well. To prevent a further opening of the second passageway once the can is filled, a step is realized after the filling operation, in which the connecting region is secured on the sealing region of the closure member. This can be achieved, for example, with a deformation on the closure member, wherein the deformation forms an end stop to prevent an undesirable movement.

BRIEF DESCRIPTION OF THE DRAWINGS

The drawings explain the solution according to the invention with the aid of example embodiments, showing in:

FIG. 3 illustrates a portion of a vertical section through an aerosol can, having an upper closure member with valve;

FIGS. 4a, 4b illustrates details from the connecting region between can shell and upper closure member;

FIGS. 5a, 5b illustrates details from the connecting region between can shell and can bottom;

FIG. 6 illustrates a vertical section through a two-way valve with a filling opening and a discharge opening; and FIG. 7 illustrates a vertical section through a can bottom with filling opening.

DETAILED DESCRIPTION OF THE EXAMPLE EMBODIMENTS

Figure 1:
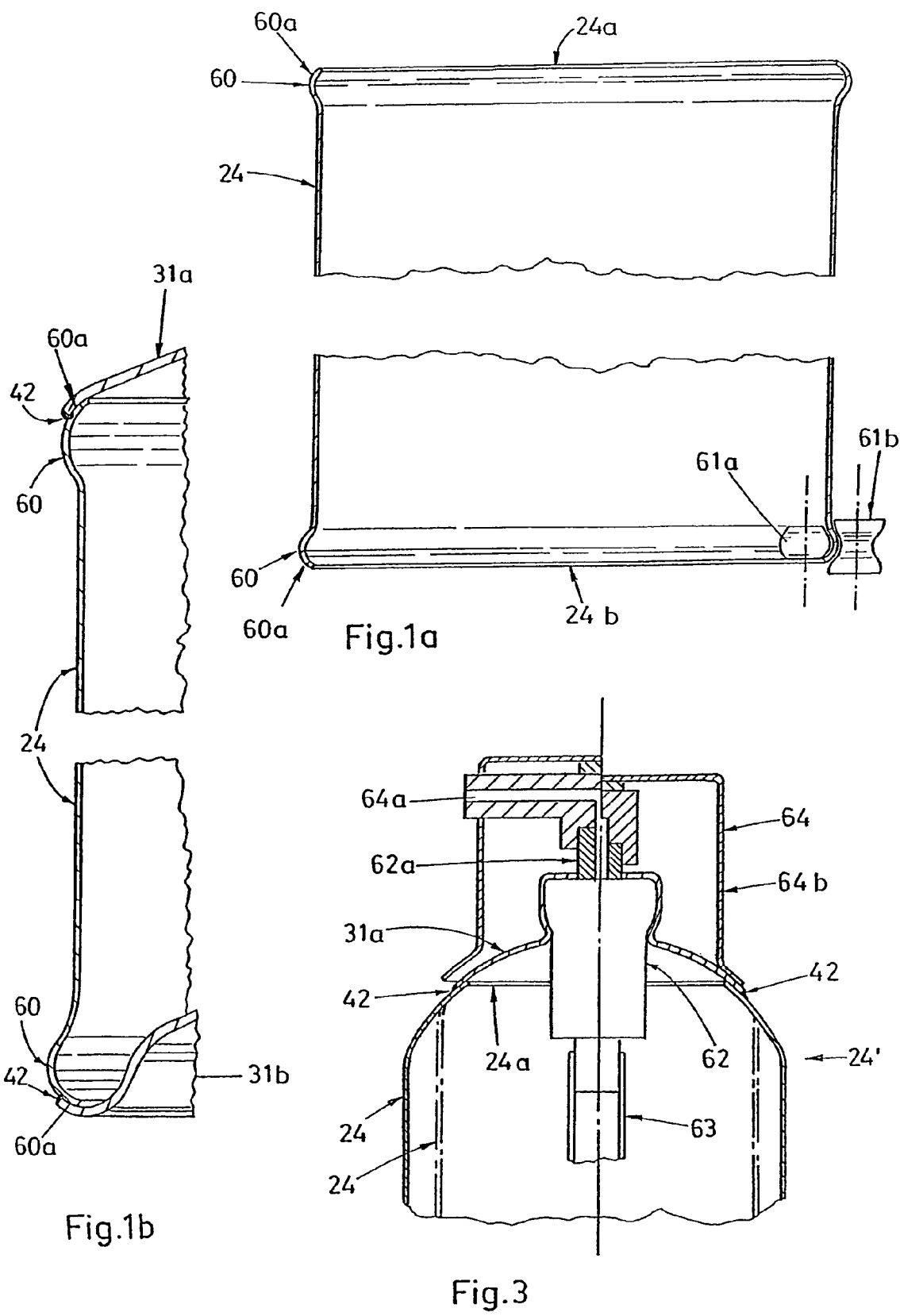
FIG. 1a illustrates a vertical section through a can shell with buckling areas at both end faces.
FIG. 1b illustrates a vertical section through a can body with buckling areas on the can shell and closure members securely welded to it.

FIG. 1a shows a can shell 24 with ring-shaped buckling areas 60, formed onto both end faces 24a and 24b, so as to project radially outward. These respective buckling areas are reduced in the cross section toward the end faces 24a, 24b. These buckling areas 60, for example, are formed by arranging two matching forming rolls 61a 61b on the inside and on the outside of the can shell 24. While the can shell 24 is rotated past the forming rolls 61a and 61b, the inside forming roll 61a can be pressed in radial direction toward the outside and against the outside forming roll 61b, until the desired buckling area 60 is formed. A buckling area 60 thus provides a shoulder 60a without requiring a reduction step on at least one end face 24a, 24b of the can shell 24. An expanded area can be produced with far less problems and higher quality as compared to a narrowed down area, thus making it possible to create a shoulder 60a with smooth surface and little expenditure.

According to FIG. 1b, closure members are pressed against the shoulders 60a of the buckling areas 60, for example a can bottom 31b or an upper closure member 31a. With the aid of a connecting seam 42 in the form of a laser-welding seam, a solid and tight connection is formed, wherein the bottom 31b is preferably welded on first. Before, or if applicable, after the welding on of the upper closure member 31a, the can shell 24 can still be reshaped, for example by expanding the can cross-sectional area at least to the diameter of the at least one buckling area 60. Prior to welding on the upper closure member 31a, forming tools such as rolls can be inserted into the can inside for expanding the can shell 24. If applicable, a fluid under pressure can also be filled into the can for expanding the can cross-sectional area, and the can shell 24 can be pressed into an internal mold. With this expanding step, a shoulder 60*a* can also be formed directly, without the above-described forming of a buckling area 60.

Figure 2:
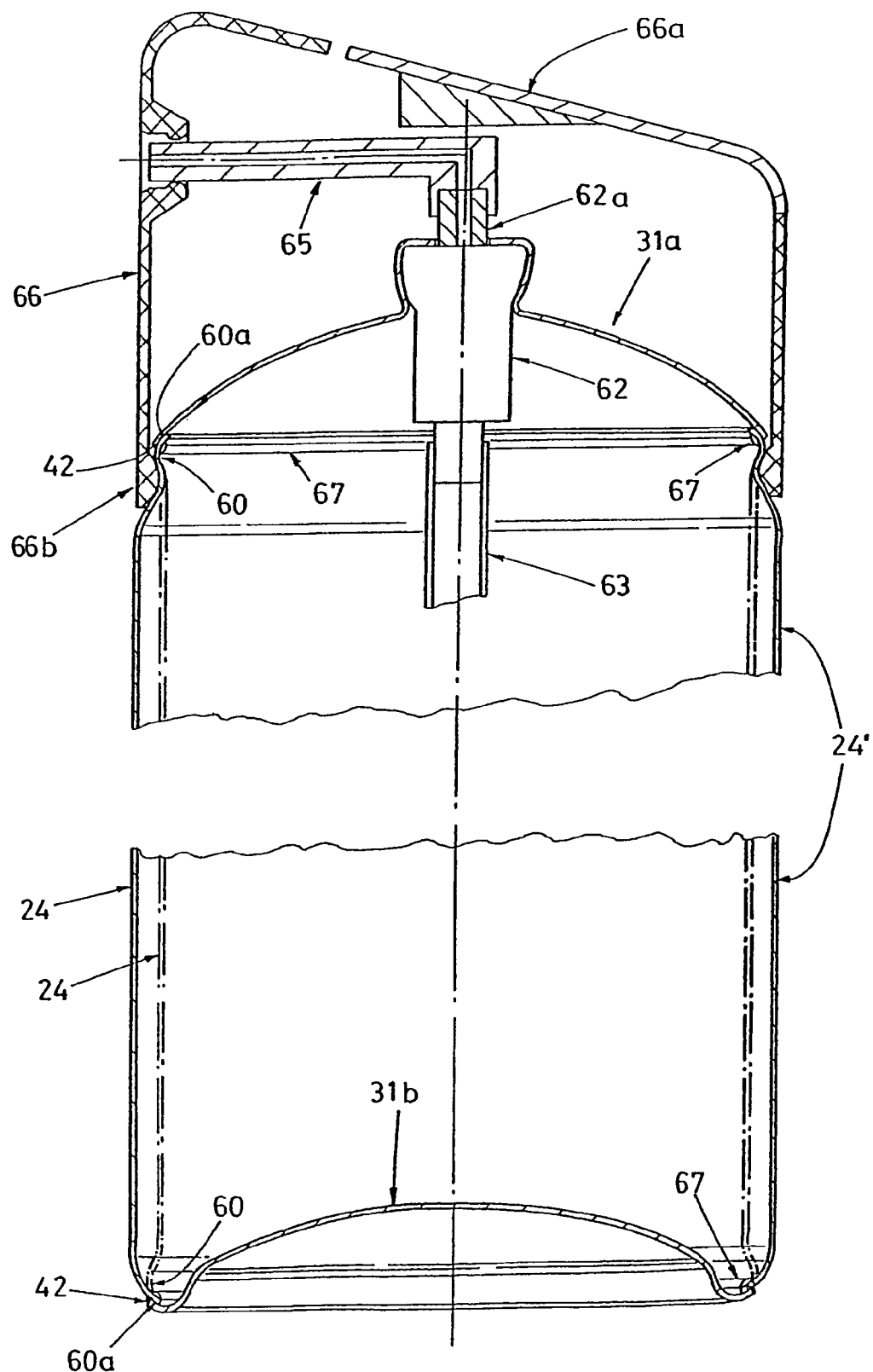
FIG. 2 illustrates a vertical section through an aerosol can, provided with an upper closure member with valve.

FIG. 2 illustrates an aerosol can 24' that is produced by using a cylindrical can shell 24 with buckling areas 60. A can bottom 31*b* was arranged on a lower shoulder 60*a*. The outer edge region of the can bottom 31*b* is adapted to the shoulder 60*a*, so that the outer edge of the can bottom 31*b* fits tightly against the shoulder 60*a* during the compressing, and a precise and tight laser-welded connecting seam 42 can be formed. Prior to fitting on the upper closure member 31*a*, the can shell 24 is expanded from a first cylindrical form to a second form, wherein this process makes it possible, for example, to generate desired surface structures. Forming tools such as rolls can be inserted into the can inside for expanding the can shell 24. However, fluid under pressure is preferably filled into the can inside for expanding the can cross section and the can shell is pressed into an inside mold, for example as disclosed in patents EP 853 513 B1, EP 853 514 B1 and EP 853 515 B1. The buckling area 60 on the upper end face 24*a* preferably remains in the original shape, so that a dome-shaped upper closure member 31*a* can be pressed against the shoulder 60*a* and can be welded on with a connecting seam 42.

The upper closure member 31*a* comprises a valve 62 from which a tube 63 extends toward the can bottom 31*b* and which can be activated via a discharge tube 62. A discharge part 65 that is fitted onto the discharge tube 62*a* is held inside a cap 66. To activate the valve 62, an activation area 66*a* of the cap 66 is pressed onto the discharge part 65. In the process, the discharge tube 62*a* is pushed down and the valve 62 is thus opened up. The cap 66 is held with the aid of a catch portion 66*b* inside a corresponding catch on the can shell 24. The catch on the can shell 24 is formed, if applicable, by the buckling area 60 or a necked-down region between the buckling area 60 and the expanded region of the can shell 24. If applicable, the catch can also be formed by the outer edge of the upper closure member 31*a* and/or the connecting seam 42.

The cap 66 covers the upper closure member 31*a* and, together with the can shell 24, which preferably comprises a decorating film, ensures an attractive appearance that advantageously matches to that of a one-piece aluminum can. Also possible are embodiments with integrally formed can shell 24 and can bottom, or where the connecting seam 42 between can shell 24 and can bottom 31*a* is covered by a bottom cover. Even if the connecting seam 42 is visible on the can bottom, it is hard to see because it is a thin laser welding seam. To prevent oxidation of the connecting seam 42, it can also be sealed with a coating.

To ensure a continuous inside coating even for the can inside, the can shell 24, the can bottom 31*b*, and the upper closure member are provided on the inside with a protective layer in the form of a film or a coating. If necessary, sealing material 67 is arranged in the form of a ring along the connecting seams 42, which ensures a continuous sealing layer even after the connecting seams 42 are formed. To prevent problems with the laser-welded seam caused by coatings, the adjoining parts in the region of the laser-welding seam can be treated with a laser to remove coatings before the actual laser welding takes place. The inside coating is not affected by this.

FIG. 3 shows the upper part of an aerosol can 24', for which the can shell 24 in the area of the reduced end face 24*a* is joined with a connecting seam 24*a* to a dome-shaped upper closure member 31*a*. If necessary, the can shell 24 is expanded from a first cylindrical form to a second form before fitting on the upper closure member 31*a*, wherein desired surface structures can be generated in the process. The closure member 31*a* comprises a valve 62, from which a tube 63 leads to the can bottom and which can be activated by means of a discharge tube 62*a*. The spray head 64 that is fitted onto the discharge tube 62*a* comprises an output channel 64*a* and a sleeve 64*b*. The sleeve 64*b* projects radially outward and axially toward the upper closure member 31*a*, preferably far enough, so that the connecting seam 42 is substantially covered and the upper closure member 31*a* is not visible. The visible portion of the aerosol can 24' comprises only the can shell with a decorative coating and the spray head 64.

With the above-described embodiment of the welded parts, it is advantageous if an upper closure member 31*a* is welded to the valve 62. By tightly welding on the upper closure member 31*a*, microscopic leaks are prevented. The aerosol can 24' is filled prior to fitting on the spraying head 64 by making use of the discharge tube 62*a*.

Once the closure member with valve is welded on, it is no longer possible to cover the welding seam on the can inside from the outside. The goal therefore is to ensure that cans with a valve part that is welded to the can shell have a continuous barrier and/or a coating on the inside wall of the can.

The embodiments according to FIGS. 4*a*, 4*b*, 5*a*, 5*b* show a solution that ensures continuous inside barriers made of plastic. For this, an inside film 205 is arranged on the inside of the can shell 240. The inside of the closure member 242 comprises an inside coating 253. During the laser welding of the closing seam 245, the inside film 205 can be destroyed, if applicable, around the seam area. A sealing bead 266 is fitted in the manner of a ring around the closure member 242 in order to seal the seam area and the end face 240*b* of the can shell 240 on the inside. Following the welding of the closing seam 245, heat is applied to the sealing bead, so that the material of the sealing bead melts and flows long enough to cover the end face 240*b* and, if applicable, the seam region. At the end of the flowing period, the material of the sealing bead cools down and/or is no longer heated, so that it becomes hard and forms a continuous sealing bridge 267 between the inside film 205 and the inside coating 253 of the closure member 242 which extends in particular also over the closing seam 245. To ensure a controlled flow, the sealing bead material must have the desired flow characteristics at the selected temperature. If applicable, the can body is made to rotate around its longitudinal axis to improve the flow behavior. It can be useful in that case if the can axis is aligned such that at least a section of the end face 240*b* and the closing seam 245, which must be covered, is at the lowest point in a vertical longitudinal plane.

The can shell 240 outside is preferably provided with a decorative film 206. The closure member 242 in particular comprises an outside coating 254. The adjoining seam contact surfaces are preferably non-coated during the welding of the closing seam 245. To prevent ugly oxidation on the can outside, the closing seam 245 is preferably covered with a ring-shaped coating material in such a way that the coating material extends from the outside coating 254 to the decorating film 206. When inserting the bottom cover 242' or a fixedly installed cap 66, an additional covering of the closing seam can be omitted.

FIG. 6 shows the upper end of an aerosol can with closure member 131*a*, which comprises a two-way valve 101. A shoulder-type reduction in the cross section and/or a shoulder 60*a* is formed on at the upper end of the can shell 24, toward the end face 24*a*. The edge region of the closure member 31*a*, which fits against this shoulder 60*a*, is pressed on tightly and is securely connected by means of a laser-welded connecting seam 42. The end faces 24*a* of both contact regions point in opposite directions and the end face 24*a* of the can shell 24 is located on the can inside. The seam contact regions, which take the shape of a shoulder when seen in a vertical section, are adapted to each other in the manner of a dome, so that they hit an end stop when pressed together and ensure an air-free contact at the connecting seam. It is therefore not necessary to provide a holding clamp directly at the seam to achieve the air-free contact. The dome-shaped embodiment of the seam contact areas is considerably more advantageous as compared to cylindrical and radially outward pointing flanges, because it ensures dimensional stability when pressed together and thus a contact without trapped air. Even a small overlapping makes it possible to form the tight laser seam. The material requirement for this seam is very low and the connection is aesthetically extremely advantageous.

The two-way valve 101 shown herein can provide two separate passageways with differently large cross sections. The first passageway is formed by a standard can valve 62 while the second passageway is formed between an inner connecting part 102 of the standard valve and an outer connecting part 103 that is connected to the can shell. For this, the inner connecting part 102 is formed such that a closing region is pressed from the can inside by a second spring 104 against a matching closing region on the outer connecting part 103. The outer connecting part 103 is connected on the radially outer edge by means of the laser-welded connecting seam 42 to the can shell 24 and/or the shoulder 60a. In the closed state, a sealing ring 105 at the sealing regions closes off the passageway between the inner and the outer connecting part 102, 103.

With a press-on sleeve 106, the inner connecting part 102 can be pressed against the can inside. In the process, a passageway is created that extends from the outside through a centrally located first flow-through opening 103a of the outer connecting part 103, through the closing region, via the sealing ring 105 and through second flow-through openings 102a of the inner connecting part 102. The housing for the valve 62 is fixedly connected to the inner connecting part 102. At least one and preferably two guide regions guide the movement of the inner connecting part 102, relative to the outer connecting part 103. A first guide region is formed between the outer edge of the inner connecting part 102 and the adjacent cylindrical section of the outer connecting part 103. A second guide region is formed, for example, by a sleeve 107, which encloses the valve 62 at the cylindrical lower end. The sleeve 107 is held by means of a holding disk 108, comprising a third through opening 108a, on the cylindrical section of the outer connecting part 103. For this, the holding disk 108 is clamped, for example, onto the outer connecting part 103. The second spring 104 fits against the holding disk 108 and presses the inner connecting part 102 into the closing position for the second passageway.

For the filling of the can with a liquid product, a filling tube 109 with sealing ring at one end is attached centrally to the outer connecting part 103. The press-on sleeve 106 opens the second passageway, so that the product can flow from the filling tube 109 through the openings and into the can inside. Subsequently, the press-on sleeve 106 is pulled back and the second spring pushes the inner connecting part 102 into the closing position. If necessary, the inner connecting part 102 is clamped in a clamping operation onto the outer connecting part 103, in particular the cylindrical section, for the closing position.

After the product is filled in, propellant gas is introduced through the standard can valve 62. For this, the discharge tube 62a is pushed slightly against the can inside, until a first radial bore 62b is connected to a ring-shaped space 62c. From the ring-shaped space 62c, a second radial bore 62d leads into the tube 63, so that the propellant gas can reach the can inside. The first spring 110, which pushes the discharge tube 62a into the position where the first passageway is closed off, is also arranged in the ring-shaped space 62c. For the discharge of the product, the standard valve is actuated in a manner known per se.

A second passageway in the upper can closing region can be omitted if the product can be filled in by way of a previously inserted valve and a filling opening that is shown in FIG. 7. Once the product is filled in through this filling opening, the propellant gas is introduced through the valve.

FIG. 7 shows a can closure 159 for the filling operation, which is welded by means of seam 145 to the can shell 140 and comprises a filling opening 160 that is sealed tightly with a closure member 161 following the filling. The closure member 161 can be either crimped on or simply pressed in. So that the filling closure 159 for the can with the closed filling opening 160 appears as bottom of the filled can, the center region projects somewhat toward the can inside and the outer ring-shaped support area 159a forms the standing surface for the can.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for securing a valve arrangement to a can shell, where the valve arrangement includes a connecting bowl and a valve, the method comprising:
    attaching the connecting bowl, as an upper closure member together with the valve, via laser welding to the can shell, wherein a cross-sectional reduction in the form of a shoulder is embodied on the can shell, toward an end face formed by a front side at an edge on an end of the can shell, wherein an edge region of the closure member that fits against the cross-sectional reduction in the form of a shoulder is pressed on tightly and is securely connected with the aid of a laser-welded connecting seam, and wherein the end face of the can shell is located inside the can.

2. The method according to claim 1, wherein the can shell and the closure member are provided on the inside with a protective layer and wherein a ring-shaped sealing material is arranged along the connecting seam, the sealing material ensuring that a continuous protective layer even after the connecting seam is formed.

3. The method according to claim 1, wherein the closure member comprises a plastic inside coating on the inside and a ring-shaped, closed sealing bead, wherein following the forming of the closing seam, the sealing bead is made to flow in a melting step and the end face of the can shell that is positioned on the can inside is covered by the material from the sealing bead.

4. The method according to claim 3, wherein the laser connecting seam is covered by the material of the sealing bead.

5. A can body with a closed can shell, comprising:
    a valve arrangement that includes a valve and a connecting bowl, the valve arrangement being at an end face formed by a front side at an edge on an end of the can shell, wherein a laser-welded connecting seam attaches the connecting bowl of the valve arrangement, as an upper closure member together with the valve, to the can shell, wherein a shoulder type cross-sectional reduction is embodied on the can shell, toward the end face, wherein an edge region of the closure member that rests tightly against the shoulder type cross-sectional reduction is securely connected via the laser-welded connecting seam, and wherein the end face of the can shell is positioned inside the can.

6. The can body according to claim 5, wherein the can shell and the closure member are provided on the inside with a protective coating, wherein a ring-shaped sealing material is arranged along the connecting seam, and wherein the sealing material ensures a continuous sealing layer for the connecting seam.

7. The can body according to claim 5, wherein the closure member comprises on the inside a plastic coating and a ring-shaped, closed sealing bead, and wherein the sealing bead is made to flow and covers the end face of the can shell.

8. The can body according to claim 7, wherein the laser connecting seam is covered by the material of the sealing bead.

9. The can body according to claim 5, wherein the valve arrangement includes two differently dimensioned flow-through cross sections, and wherein a first cross section is formed for inserting propellant gas and for discharging a product and a second cross section is formed for filling in the product.

10. The can body according to claim 5, wherein a closable filling opening is formed in the can bottom.

11. The method according to claim 2, wherein the closure member comprises a plastic inside coating on the inside and a ring-shaped, closed sealing bead, wherein following the forming of the closing seam, the sealing bead is made to flow in a melting step and the end face of the can shell that is positioned on the can inside is covered by the material from the sealing bead.

12. The method according to claim 11, wherein the laser connecting seam is also covered by the material of the sealing bead.

13. The can body according to claim 6, wherein the closure member comprises on the inside a plastic coating and a ring-shaped, closed sealing bead, and wherein the sealing bead is made to flow and covers the end face of the can shell.

14. The can body according to claim 13, wherein the laser connecting seam is also covered by the material of the sealing bead.

* * * * *